United States Patent [19]
Zengel

[11] Patent Number: 6,078,355
[45] Date of Patent: Jun. 20, 2000

[54] VEHICLE PERIPHERY MONITORING SYSTEM

[76] Inventor: John A. Zengel, 226 Pleasant Hill Dr., Centerville, Ohio 45459

[21] Appl. No.: 08/738,397

[22] Filed: Oct. 25, 1996

[51] Int. Cl.[7] .................................................. H04N 7/18
[52] U.S. Cl. ........................................ 348/148; 348/151
[58] Field of Search ................................... 348/148, 151, 348/373, 335, 375; 340/937; 358/108, 103; 354/286; 359/896; H04N 7/18

[56] References Cited

U.S. PATENT DOCUMENTS

| | | | |
|---|---|---|---|
| 4,030,113 | 6/1977 | Obresckow | 348/173 |
| 4,277,804 | 7/1981 | Robinson | 348/148 |
| 4,789,904 | 12/1988 | Peterson | 348/148 |
| 5,027,200 | 6/1991 | Pertrossian | 348/148 |
| 5,289,321 | 2/1994 | Secor | 348/148 |
| 5,680,123 | 10/1997 | Lee | 348/148 |

*Primary Examiner*—Tommy P. Chin
*Assistant Examiner*—Tung Vo

[57] ABSTRACT

A vehicle periphery monitoring system for enabling a driver of a motor vehicle to see traffic on either side of the motor vehicle without requiring the driver to look at a side view mirror includes a display monitor positioned concentrically within the vehicle, and two cameras secured to the opposite sides of the roof of the vehicle and electrically coupled to the display monitor which displays an image reflecting the left and right rear view of the vehicle.

5 Claims, 3 Drawing Sheets

VEHICLE PERIPHERY MONITORING SYSTEM

BACKGROUND OF THE INVENTION

1. Field of the Invention

The present invention relates to Mirror Devices and more particularly pertains to a new vehicle periphery monitoring system for enabling a driver of a motor vehicle to see traffic on either side of the motor vehicle without requiring the driver to look through a side view mirror.

2. Description of the Prior Art

The use of Mirror Devices is known in the prior art. More specifically, Mirror Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Mirror Devices include U.S. Design Pat. No. 318,644; U.S. Pat. No. 5,210,655; U.S. Pat. No. 5,289,321; U.S. Pat. No. 5,159,497; U.S. Pat. No. 5,096,287 and U.S. Pat. No. 4,277,804.

While these devices fulfill their respective, particular objectives and requirements, the aforementioned patents do not disclose a new vehicle periphery monitoring system. The inventive device includes a display monitor positioned concentrically within the vehicle, and two cameras secured to the opposite sides of the roof of the vehicle and electrically coupled to the display monitor which displays an image reflecting the left and right rear view of the vehicle.

In these respects, the vehicle periphery monitoring system according to the present invention substantially departs from the conventional concepts and designs of the prior art, and in so doing provides an apparatus primarily developed for the purpose of enabling a driver of a motor vehicle to see traffic on either side of the motor vehicle without requiring the driver to look through a side view mirror.

SUMMARY OF THE INVENTION

In view of the foregoing disadvantages inherent in the known types of Mirror Devices now present in the prior art, the present invention provides a new vehicle periphery monitoring system construction wherein the same can be utilized for enabling a driver of a motor vehicle to see traffic on either side of the motor vehicle without requiring the driver to look through a side view mirror.

The general purpose of the present invention, which will be described subsequently in greater detail, is to provide a new vehicle periphery monitoring system apparatus and method which has many of the advantages of the Mirror Devices mentioned heretofore and many novel features that result in a new vehicle periphery monitoring system which is not anticipated, rendered obvious, suggested, or even implied by any of the prior art Mirror Devices, either alone or in any combination thereof.

To attain this, the present invention generally comprises a display monitor positioned concentrically within the vehicle, and two cameras secured to the opposite sides of the roof of the vehicle and electrically coupled to the display monitor which displays an image reflecting the left and right rear view of the vehicle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicle periphery monitoring system apparatus and method which has many of the advantages of the Mirror Devices mentioned heretofore and many novel features that result in a new vehicle periphery monitoring system which is not anticipated, rendered obvious, suggested, or even implied by any of the prior art Mirror Devices, either alone or in any combination thereof.

It is another object of the present invention to provide a new vehicle periphery monitoring system which may be easily and efficiently manufactured and marketed.

It is a further object of the present invention to provide a new vehicle periphery monitoring system which is of a durable and reliable construction.

An even further object of the present invention is to provide a new vehicle periphery monitoring system which is susceptible of a low cost of manufacture with regard to both materials and labor, and which accordingly is then susceptible of low prices of sale to the consuming public, thereby making such vehicle periphery monitoring system economically available to the buying public.

Still yet another object of the present invention is to provide a new vehicle periphery monitoring system which provides in the apparatuses and methods of the prior art some of the advantages thereof, while simultaneously overcoming some of the disadvantages normally associated therewith.

Still another object of the present invention is to provide a new vehicle periphery monitoring system for enabling a driver of a motor vehicle to see traffic on either side of the motor vehicle without requiring the driver to look through a side view mirror.

Yet another object of the present invention is to provide a new vehicle periphery monitoring system which includes a display monitor positioned concentrically within the vehicle, and two cameras secured to the opposite sides of the roof of the vehicle and electrically coupled to the display monitor which displays an image reflecting the left and right rear view of the vehicle.

Still yet another object of the present invention is to provide a new vehicle periphery monitoring system that decreases lane change accidents.

Even still another object of the present invention is to provide a new vehicle periphery monitoring system that reduces a driver's blind spots while driving.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
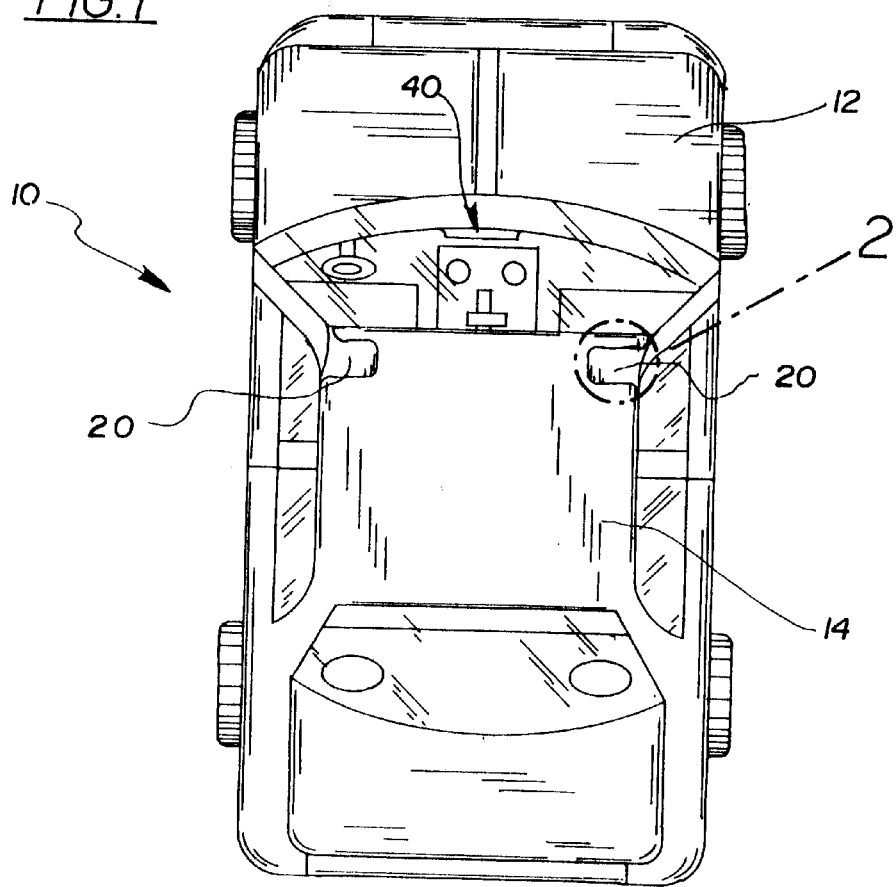
FIG. 1 is a top view of a new vehicle periphery monitoring system positioned onto a vehicle according to the present invention.
Figure 2:
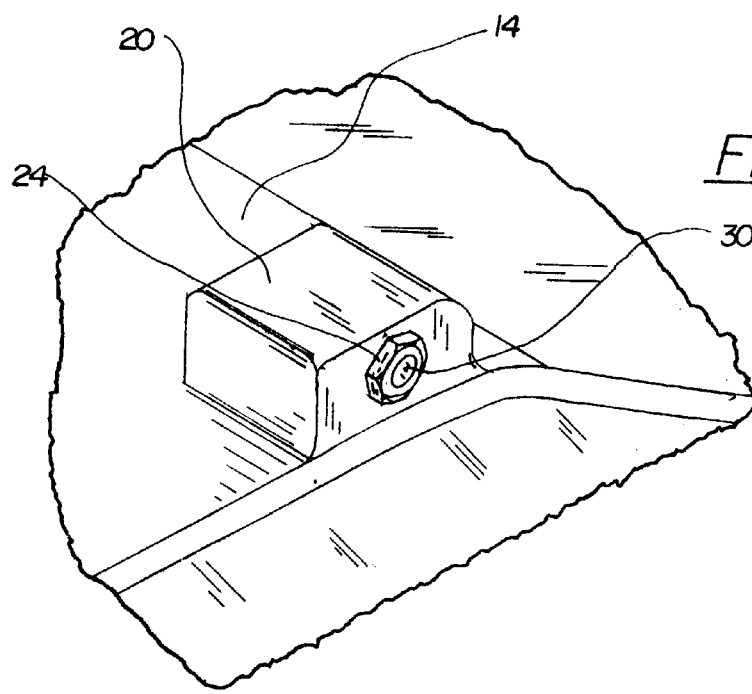
FIG. 2 is a magnified view of the camera secured to the roof of the vehicle from FIG. 1.

With reference now to the drawings, and in particular to FIGS. 1 through 6 thereof, a vehicle periphery monitoring system embodying the principles and concepts of the present invention and generally designated by the reference numeral 10 will be described.

More specifically, it will be noted that the vehicle periphery monitoring system 10 comprises a display monitor 40 positioned concentrically within the vehicle 12, and two cameras 30 secured to the opposite sides of the roof 14 of the vehicle 12 and electrically coupled to the display monitor 40 which displays an image reflecting the left and right rear view of the vehicle 12.

Figure 3:
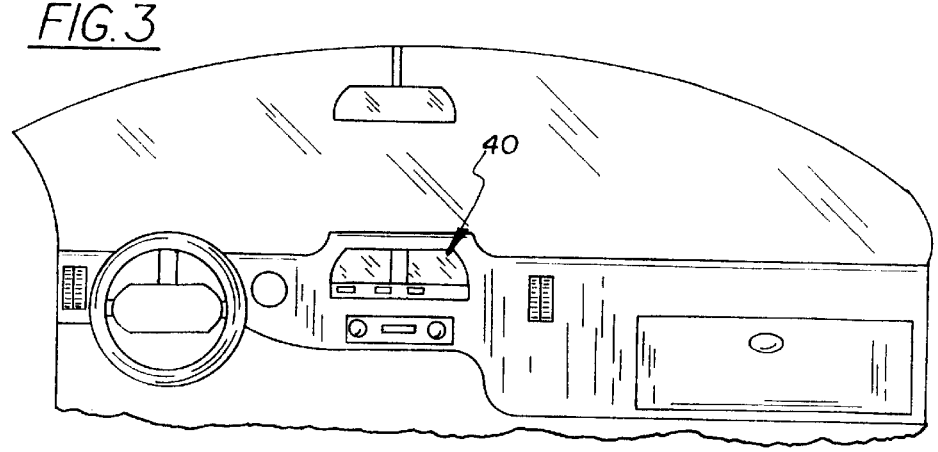
FIG. 3 is an front interior view of the vehicle displaying the display monitor.
Figure 4:
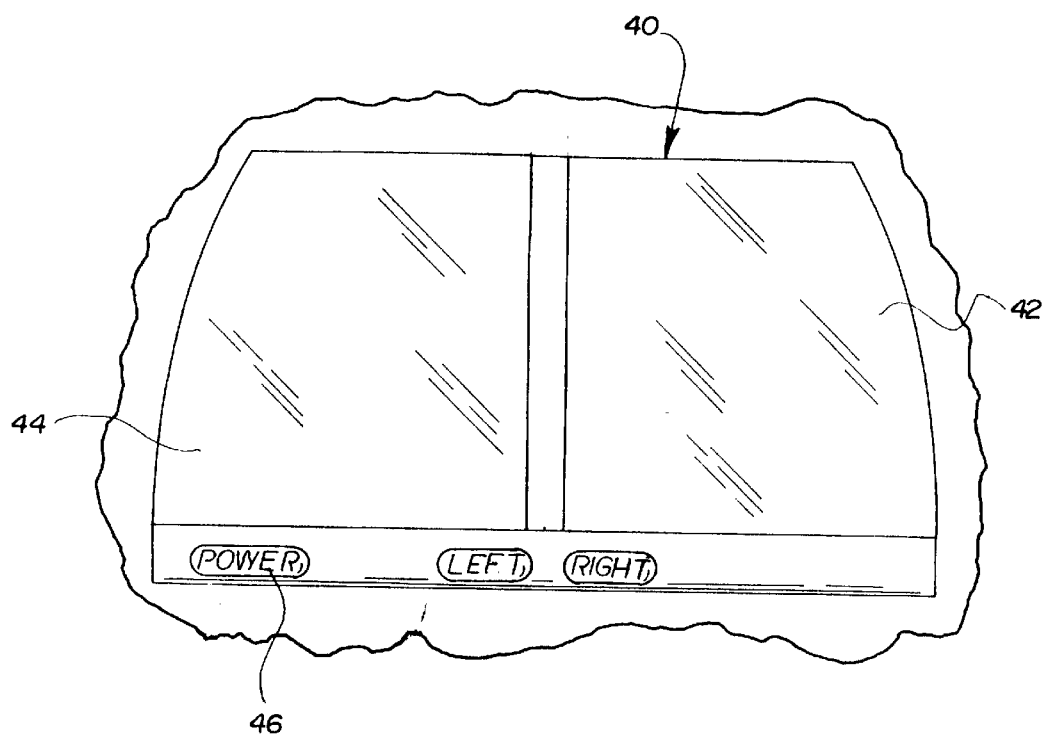
FIG. 4 is a magnified front view of the display monitor.
Figure 5:
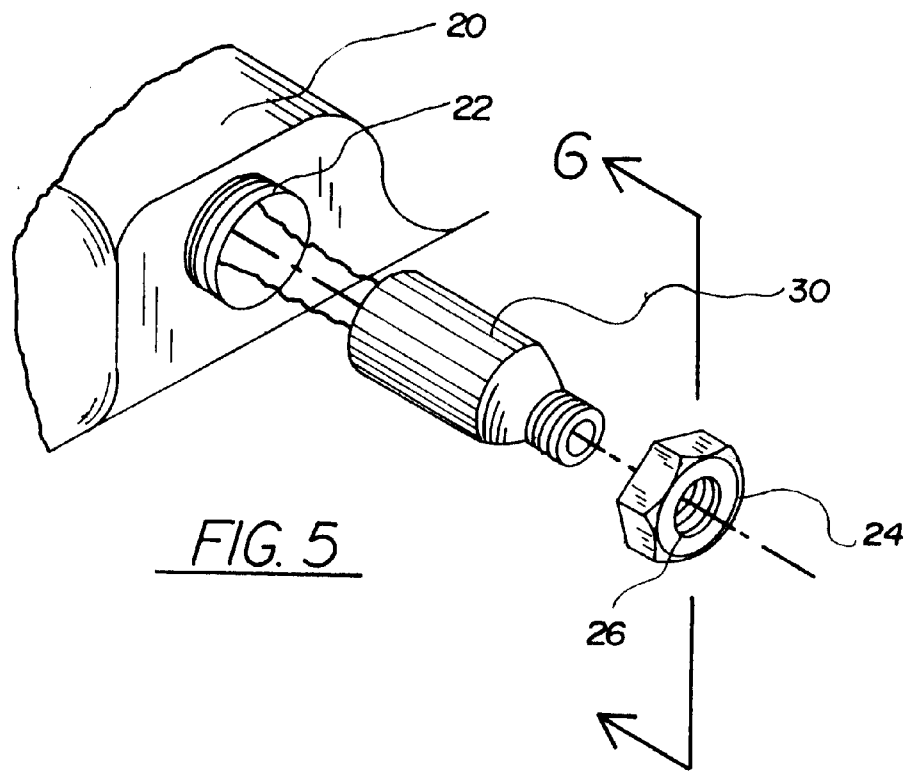
FIG. 5 is an exploded isometric view of the camera positioned within the camera housing.

As best illustrated in FIGS. 1 through 6, it can be shown that the display monitor 40 positioned within a vehicle 12 where a driver may easily view the display monitor 40. A pair of camera housings 20 are secured to opposite sides of a roof 14 of the vehicle 12 as best shown in FIG. 1 of the drawings. A pair of cameras 30 are secured within the camera housings 20 thereby viewing a rear area of the vehicle 12. The pair of camera 30 are electrically coupled to the display monitor 40 which displays the rear area. The camera housing 20 has a threaded male end 22 secured to a rear surface of the camera housing 20 as best shown in FIG. 5 of the drawings. The camera 30 slidably projects through the threaded male end 22. The camera 30 has a threaded end 32 as shown in FIG. 5 of the drawings.

Figure 6:
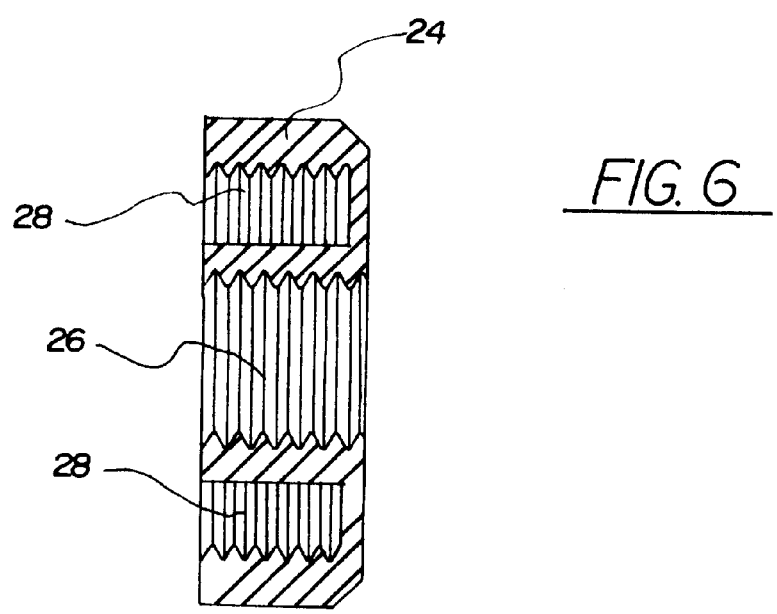
FIG. 6 is a cross sectional view taken along line 6—6 of FIG. 5.

As shown in FIG. 6 of the drawings, a threaded nut 24 has a first interior threading 26 and a second interior threading 28. The second interior threading 28 is coaxial with and outside of the first interior threading 26. The first interior threading 26 matingly couples to the threaded end 32. The second interior threading 28 matingly couples to the threaded male end 22 thereby securing the camera 30 within the camera housing 20.

As shown in FIGS. 3 and 4, the display monitor 40 has a right display 42 electrically coupled to the camera 30 positioned to the right side of the roof 14. A left display 44 is electrically coupled to the camera 30 positioned to the left side of the roof 14 to display the left rear area.

In use, the camera 30 reads the rear area behind the vehicle 12. The camera 30 thereafter electronically sends a signal to the display monitor 40 which displays the rear area for the user to see without turning his or her head.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vehicle periphery monitoring system comprising:

a display monitor positioned within a vehicle such that a driver can easily view said display monitor;

a pair of camera housings secured to opposite sides of a roof of said vehicle;

a pair of cameras secured within said camera housings viewing a rear area of said vehicle and electrically coupled to said display monitor which displays said rear area;

said camera housing including a threaded male end secured to a rear surface of said camera housing, where said camera slidably projects through said threaded male end;

said camera including a threaded end; and a threaded nut having a first interior threading and a second interior threading, where said second interior threading is coaxial with and outside of said first interior threading, and said first interior threading matingly couples to said threaded end and said second interior threading matingly couples to said threaded male end thereby securing said camera within said camera housing.

2. The vehicle periphery monitoring system of claim 1, wherein said display monitor includes:
- a right display electrically coupled to said camera positioned to the right side of said roof; and
- a left display electrically coupled to said camera positioned to the left side of said roof.

3. A vehicle periphery monitoring system comprising:
- a display monitor positioned within a vehicle such that a driver can easily view said display monitor;
- a pair of camera housings secured to said vehicle;
- a pair of cameras, each camera secured within a respective one of said camera housings, each said camera directed to view a respective portion of a peripheral area surrounding said vehicle, each said camera being electrically coupled to said display monitor for selectively displaying each respective portion of the peripheral area;
- each said camera housing including a threaded male end extending from a rear surface of said respective camera housing, wherein each said camera slidably projects through a respective one of said threaded male ends;
- each said camera including a threaded end; and
- a pair of threaded nuts, each threaded nut having a first interior threading and a second interior threading, wherein said second interior threading is coaxial with and outside of said first interior threading, and said first interior threading matingly couples to a respective one of said threaded ends and said second interior threading matingly couples to a respective one of said threaded male ends thereby securing each said camera within a respective one of said camera housings.

4. The vehicle periphery monitoring system of claim 3, wherein said display monitor further comprises:
- a first display area electrically coupled to said camera positioned to a first side of said vehicle; and
- a second display area electrically coupled to said camera positioned to a second side of said vehicle.

5. A vehicle periphery monitoring system comprising:
- a display monitor positioned within a vehicle such that a driver can easily view said display monitor;
- a camera housing secured to said vehicle;
- a camera secured within said camera housing, said camera directed to view a portion of a peripheral area surrounding said vehicle, said camera being electrically coupled to said display monitor for displaying said portion of the peripheral area;
- said camera housing including a threaded male end secured to a rear surface of said camera housing, wherein said camera slidably projects through said threaded male end;
- said camera including a threaded end; and
- a threaded nut having a first interior threading and a second interior threading, where said second interior threading is coaxial with and outside of said first interior threading, and said first interior threading matingly couples to said threaded end and said second interior threading matingly couples to said threaded male end thereby securing said camera within said camera housing.

* * * * *